United States Patent [19]

Theiler, Sr.

[11] 4,229,849
[45] Oct. 28, 1980

[54] HAND CRIMP TOOL

[75] Inventor: Werner C. Theiler, Sr., Dix Hills, N.Y.

[73] Assignee: Minnesota Mining and Manufacturing Company, St. Paul, Minn.

[21] Appl. No.: 899,337

[22] Filed: Apr. 24, 1978

[51] Int. Cl.³ .............................................. B25F 1/00
[52] U.S. Cl. ....................................................... 7/107
[58] Field of Search ........................... 7/107; 140/106; 81/9.5 R, 9.5 B

[56] References Cited

U.S. PATENT DOCUMENTS

| 3,120,773 | 2/1964 | Esser | 7/107 X |
| 3,525,107 | 8/1970 | Hays | 7/107 |
| 3,771,222 | 11/1973 | Sakuma | 7/107 X |
| 3,902,206 | 9/1975 | Naquin | 7/107 |
| 4,006,502 | 2/1977 | Strickland | 7/107 |
| 4,028,756 | 6/1977 | Couto | 7/107 |

Primary Examiner—James G. Smith
Attorney, Agent, or Firm—Robert K. Youtie

[57] ABSTRACT

A pliers-type tool including pivoted elements having complementary jaws at one end and lever arms provided with handles at the other end, the jaws tapering in the directions toward each other, one jaw tapering to a cutting edge and the other jaw tapering to a truncated surface defining an anvil, the jaws further tapering to concave crimping edges, while the lever arms are provided with mating semi-circular insulation cutting edges, and one lever arm is provided with a pair of spaced cutouts and the other lever arm is provided with a cutout and adjacent protrusion, which cutouts and protrusion mate for crimping different size connectors.

4 Claims, 10 Drawing Figures

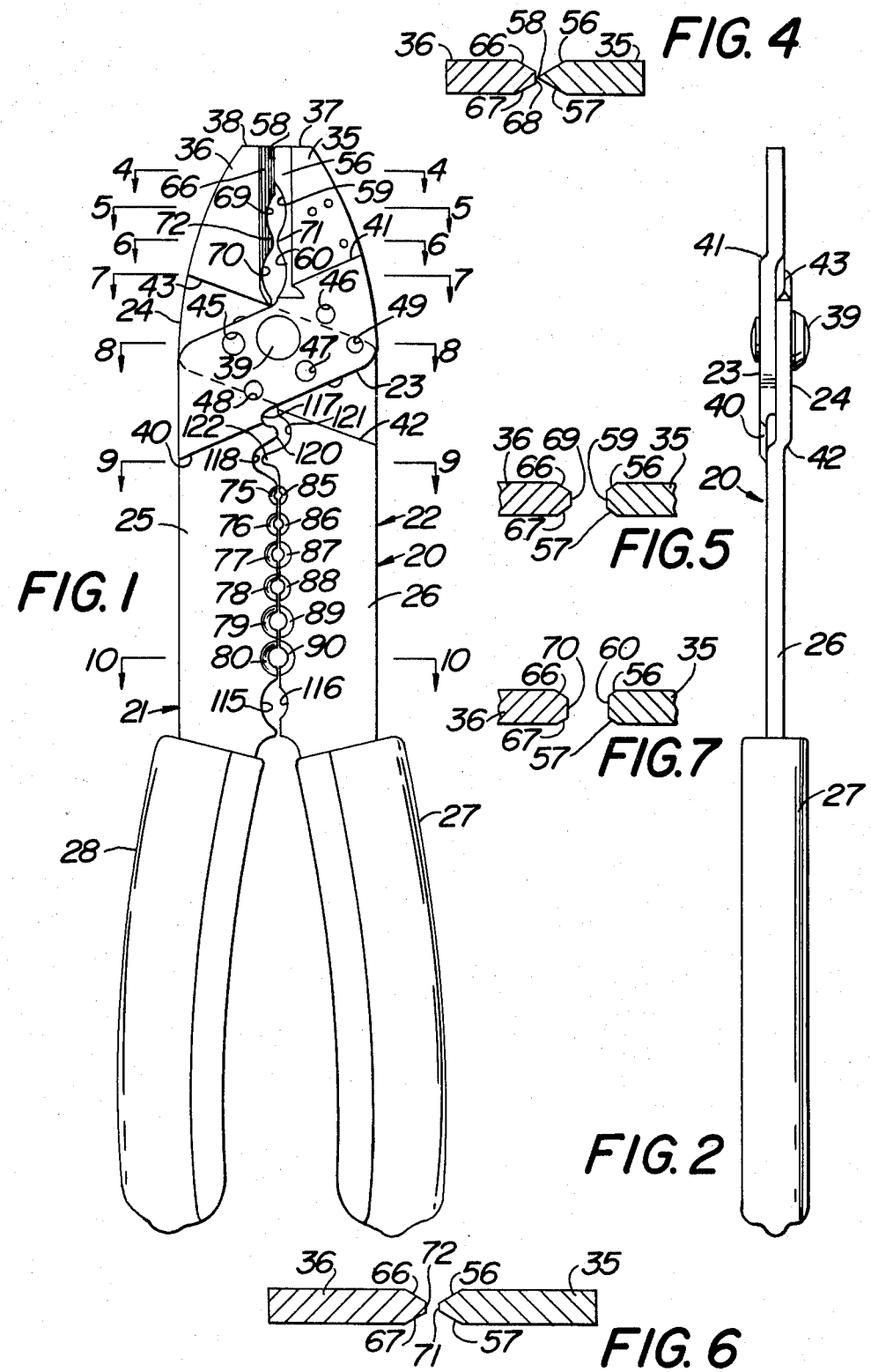

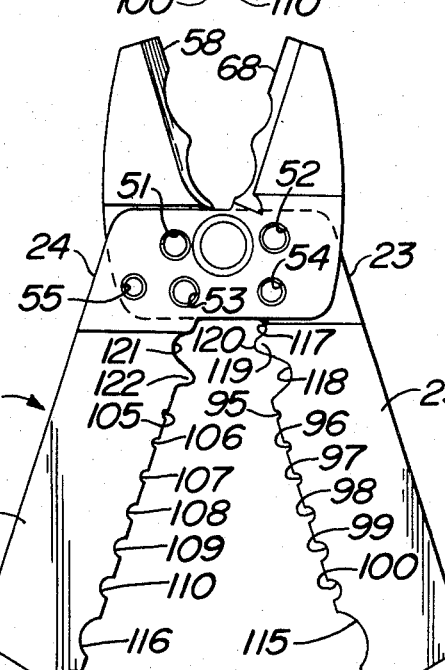

HAND CRIMP TOOL

BACKGROUND OF THE INVENTION

As is well known to those versed in the art, tools for operating on electrical connectors, including terminals, splices and the like, have been highly developed and inclusive of various functions, but have required relatively complex and expensive manufacturing procedures. Further, the desiderata of multiple functions in prior art tools has necessitated tools of substantial size and consequent high cost.

SUMMARY OF THE INVENTION

It is, therefore, an important object of the present invention to provide a tool for performing operations upon electrical connectors of various kinds, which tool is capable of effecting substantial savings in manufacture, with improvements in quality and functional efficiency, and further which permits of smaller tool size for convenience and economy, without sacrificing versatility and durability.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a longitudinal plan view showing one side of a tool of the present invention in closed condition.

FIG. 2 is a longitudinal view taken from the right-hand side of FIG. 1.

FIG. 3 is a longitudinal plan view of the tool of FIG. 1, showing the other side and illustrating the tool in an open condition.

FIG. 4 is a transverse sectional view taken generally along the line 4—4 of FIG. 1.

FIG. 5 is a transverse sectional view taken generally along line 5—5 of FIG. 1.

FIG. 6 is a transverse sectional view taken generally along the line 6—6 of FIG. 1.

FIG. 7 is a transverse sectional view taken generally along the line 7—7 of FIG. 1.

FIG. 8 is a transverse sectional view taken generally along the line 8—8 of FIG. 1.

FIG. 9 is a transverse sectional view taken generally along the line 9—9 of FIG. 1.

FIG. 10 is a transverse sectional view taken generally along the line 10—10 of FIG. 1.

DESCRIPTION OF THE PREFERRED EMBODIMENT

Referring now more particularly to the drawings, and specifically to FIG. 1-3 thereof, a tool is there generally designated 20, and may be generally of a plier-type including pivoted crossing elongate members having opposite pairs of adjacent ends defining jaws and handles.

More specifically, the tool 20 may include a pair of elongate members, respectively designated 21 and 22, which may be similar, but with certain critical differences.

The elongate members 21 and 22 may each include a transversely extending crossing portion or part, as at 23 and 24, respectively. Extending from each crossing part 23 and 24 of respective elongate tool members 21 and 22 are a pair of elongate, substantially straight intermediate parts or lever arms 25 and 26. Longitudinally outwardly from respective lever arms 25 and 26 there may extend respective handles or handgrips 27 and 28, which maybe comfortably sheathed in soft gripping sleeves or parts 29 and 30, say of flexible plastic, or the like.

Extending from respective crossing parts 23 and 24 oppositely outwardly with respect to the lever arms 25 and 26 may be a pair of jaw parts or jaws 35 and 36, respectively. In the closed tool condition of FIG. 1, the lever arms 25 and 26 may extend in general parallelism with each other to the handles 27 and 28, while the jaws 35 and 36 may extend in general parallelism with each other to substantially coextensive termination at free ends 37 and 38.

In manufacturing practice, the elongate tool elements 21 and 22 may be blanked from flat stock for subsequent machining. The crossing part 23 extends generally transversely between and connects to its associated lever arm 25 and jaw 35, serving to offset the lever arm and jaw both laterally and longitudinally. Similarly, the connecting part 24 is rigidly connected between and effects lateral and longitudinal offsetting of the lever arm 25 and jaw 36. Extending through the crossing parts 23 and 24 may be a rivet 39, say having its axis approximately symmetrical with respect to the crossing members 21 and 22, say with the adjacent, facing or inner edges of the lever arms 25, 26 and jaws 35, 36 generally radially of the pivotal connection or rivet 39.

More specifically, the elongate member 21 includes the generally rectangular elongate lever arm 25, from one end of which extends the transverse crossing part 23. In particular, the transverse crossing part 23 may be integral with the lever arm 25, joined to the latter by an upset formation 40 extending generally transversely and obliquely across the lever arm 25. The crossing part 23 extends transversely obliquely from the inner end of lever arm 25, and is provided remote therefrom with an upsetting formation or bend 41 generally similar to the upsetting formation or bend 40. Further, the upsetting formation or bend 40 may upset the crossing part 23 approximately half the thickness of elongate member 21 out of the plane of lever arm 25, while the upsetting formation or bend 41 may offset the jaw 35 approximately one-half the thickness of the elongate member generally into a plane coplanar with lever arm 25.

Similarly, the lever arm 26 may terminate inwardly and connect to crossing part 24 at an outwardly offsetting portion or bend 42, the crossing part 24 extending from the lever arm 26 transversely obliquely onto the opposite side of pivot 39, where it is provided with an additional offsetting portion or bend 43 at juncture with the jaw part 36. Thus, the crossing part 24 is offset downwardly, as seen in FIG. 1, out of the plane of lever arm 26, approximately half the thickness thereof for extension beneath raised crossing part 23, and the jaw part 36 is upset or displaced upwardly approximately half the material thickness into substantial coplanarity with lever arm 26. By this construction, lever arms 25 and 26 may be substantially coplanar with each other, as may jaw parts 35 and 36, while crossing parts 23 and 24 are disposed in crossing, facing engagement. Also, it will be apparent in the closed tool condition of FIG. 1 that jaw 35 carried by lever arm 25 is offset from the latter generally parallel thereto and in general longitudinal alignment with lever arm 26, while jaw 36 carried by lever arm 26 is offset from the latter lever arm and in general longitudinal alignment with lever arm 25.

Provided in the crossing part 23 of member 21 are a plurality of internally threaded through holes 45, 46, 47, 48 and 49. These internally threaded holes are of progressively smaller diameters, each corresponding to a conventional threaded screw size, and may advantageously be marked to indicate the screw thread size for conforming reception therein. Further, the several holes 45-49 are successively located at increased radial distances from the axis of pivot 39.

Formed in the crossing part 24, as best seen in the open tool position of FIG. 3, are a plurality of through holes 51-54, in alignment with respective holes 45-49. However, the holes 51-54 may be slightly larger, say of internal diameters corresponding to the internal root diameters of the respective threaded holes. Thus, a bolt may be threaded into a properly accommodating hole 45-49 and its aligned hole 51-54 with the tool 20 open, and the tool closed to shear and sever the bolt generally along the facing surfaces of crossing parts 23 and 24. By arranging the several bolt cutting holes 45-49, and 51-54 circumferentially about the pivot 39, there is effected economy of space. Further, by locating the bolt cutting holes 45-49 and 51-54 with the larger holes closest to the pivotal axis 39, and the successively smaller holes progressively further from the pivotal axis, it will be appreciated that a fairly constant manual force will be required for effecting bolt severance, which may be sufficiently moderate for wide usage.

The jaw 35 is provided on opposite sides with a pair of convergent surfaces 56 and 57 which converge in the direction toward the facing jaw 36. In particular, the convergent beveled or chamfered surfaces 56 and 57 may each be generally flat, on opposite sides of the jaw 35, and may be formed by a single machining operation. Proximate to the distal jaw end 37, the convergent surfaces 56 and 57 taper to a meeting edge 58, which is a generally straight cutting or knife edge, for a purpose appearing presently. Just inward from the distal or outer end region of jaw 35, the convergent or tapering surfaces 56 and 57 are cut away, as in an arcuately concave configuration, to define an arcuately concave surface or edge 59, see FIGS. 1 and 5. Similarly, spaced adjacent to and inwardly of the concave arcuate edge 59, the jaw 35 has its convergent or tapering surfaces 56 and 57 cut away, as by an arcuately concave cutout to define an arcuately concave surface or edge 60. The arcuately concave surface 60 may terminate proximate to the crossing part 23.

The other jaw 36 has its region in adjacent facing relation with respect to the jaw 35 similarly chamfered or beveled, as by generally flat convergent surfaces 66 and 67 which taper or converge in the direction toward the complementary jaw 35. The outer or distal region of jaw 36, proximate to jaw end 38, may have its convergent surfaces 66 and 67 converging toward and terminating at a generally flat truncating surface 68. The flat truncating surface 68 is arranged for movement into bearing engagement with the straight cutting edge 58 of jaw 35 upon swinging movement of the jaws together to the position shown in FIG. 6. This is a limiting position of movement of the members 21 and 22 toward each other.

In opposed facing relation with respect to the arcuately concave surface 59 of jaw 35, the jaw 36 is provided with a similar arcuately concave surface or edge 69 defined by termination of the convergent generally flat surfaces 56 and 57, see FIG. 5.

Also, the convergent flat surfaces 66 and 67, opposite to the arcuately concave surface 60, are cut away by a complementary arcuately concave surface 70.

Thus, the knife edge 58 cooperates with the flat surface 68 as a wire cut off station, the flat surface providing an anvil for the cutting edge 58. Further, the facing arcuately concave edges 59 and 69 cooperate with each other for crimping barrels onto stripped wire ends, such as larger barrels or insulated barrels. The sizes of cutouts 59, 69, 60 and 70 may vary to accommodate barrels of different diameters. The facing jaw regions 71 and 72, intermediate the cutouts 59, 60, 69 and 70, may be spaced from each other in the closed position of FIG. 1 to permit of squeezing therebetween of crimped connector material.

Provided along the laterally inner or facing edge region of each lever arm 25 and 26 are a plurality of mating, semi-circular countersunk formations, as at 75-80 spaced longitudinally along lever arm 25, and 85-90 spaced longitudinally along lever arm 26. The countersunk formations define concave semi-circular cutting edges, the pair of countersunk formations 75 and 85 being in mating facing relation with each other and of the same diameter so as to complement each other in the closed tool condition and define a generally circular countersunk formation. Similarly, the adjacent facing countersunk formations 76 and 86 are of equal diameter, slightly larger than that of the formations 75 and 85, while the facing formations 77 and 87 are of slightly larger diameter than the formations 76 and 86, the formations being progressively larger in the direction away from pivot 69.

The semi-circular cutting edges 95-100 of semi-circular countersunk formations 75-80 are generally semi-circular and respectively combined with the cutting edges 105-110 to define generally circular cutting edges. As appears in FIG. 1, the adjacent side edges of lever arms 25 and 26 are slightly spaced apart in the limiting closed tool position. However, the several complementary countersunk formations 75-80 and 85-90 are sized for severance through the insulation of conventional size wires without cutting the wire core. As the complementary countersunk formations 75-80 and 85-90 do not meet, there is a slight tag on unsevered insulation region, which may be readily torn, or a wire may be rotated for complete severance.

The array of countersunk formations 75-80 and 85-90 is spaced from the crossing parts 23 and 24, and also spaced from the handles 27 and 28.

The countersunk formations 75-80 and 85-90 permit of relatively simple, easy and inexpensive manufacture by the use of gang cutters, for simultaneous formation of all countersunk formations. Also, the circular countersunk formations afford a highly desirable guide to insure proper central location of a wire to be stripped.

Also formed in the lever arms 25 and 26, as outward of the outermost countersunk formations 80, 90 may be a pair of arcuately concave, facing cutouts, as at 115 and 116. These cutouts may be suitably configured for crimping connectors to automotive ignition wire of conventional sizes.

One of the lever arms, say lever arm 25, may be formed at a location between the innermost countersunk formations 75, 80 and the crossing parts 23 and 24, with a pair of arcuately concave cutouts or notches, as at 117 and 118, the former being closer to the pivotal axis 39 and of lesser depth, and the later being more spaced from the pivot and of greater depth. The material 119 remaining between the cutouts 117 and 118 may terminate at a rounded nose 120, substantially flush with the remaining uncut portions of the inner edge of lever arm 25. That is, the nose 120 defines a projection between the cutouts 117 and 118, but does not project beyond the edge of the lever arm.

The lever arm 26, in the region opposite to nose 120, is formed with an arcuate recess or cutout 121 configured to spacedly receive the nose 120 in the closed tool position of FIG. 1. Further, adjacent to the cutout 121 there is provided a protrusion 122 projecting beyond the inner edge of lever arm 26 for entry into the larger cutout or recess 118 in spaced relation therein, also as seen in FIG. 1, This construction of a pair of adjacent, spaced cutouts 117 and 118 with an intermediate nose 120 and a single cutout 121 with a protrusion 122 combines to afford a variety of crimping surfaces for different size barrels, primarily bare or uninsulated connector barrels. This specifically described configuration is very economical of space so as to reduce the necessary extent of the tool, and its location adjacent to the pivot 39 on the handle side thereof affords a great degree of crimping force and control by the user.

As may be observed in the closed position of FIG. 1, it will be seen that the crimping surfaces 59 and 69 are symmetrical about a center line extending radially from the pivotal axis of pin 39, and similarly the crimping surfaces 60 and 70 are symmetrical about this center line. As a result, the actual crimping surfaces 59 and 69 are of substantially equal width or thickness, and similarly the crimping surfaces 60 and 70 are of approximate equal width or thickness. Also, it will be apparent that the meeting edge of convergent surfaces 56 and 57 defining knife edge 58 is located slightly offset from this center line. Thus, without sacrificing operating efficiency, the knife edge 58 may be located offset from the center line, which enables the surfaces 56, 57 to be manufactured in a single machining operation. Similarly, the convergent surfaces 66 and 67 may be produced in a single machining operation.

From the foregoing, it is seen that the present invention provides a tool for operating upon electrical connectors which is highly versatile in use, capable of effecting substantial economies in manufacture, both in time and materials, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A tool for electrical connectors and the like, said tool comprising a pair of crossing parts pivotally connected together, a pair of jaws extending from respective crossing parts in facing relation with and swingable toward and away from each other and terminating at free ends, a pair of lever arms extending from respective crossing parts oppositely away from said jaws for swinging movement therewith in facing relation with each other, handgrips extending from the distal ends of said lever arms, and a single pair only by convergent entirely planar surfaces on the facing region of each of said jaws and tapering toward each other, the converging planar surfaces of one jaw converging at one location to intersect with each other in a generally straight cutting edge, the converging planar surfaces of the other jaw converging at a facing location to respective intersections with opposite sides of a generally flat truncated surface defining an anvil for said cutting edge and limiting swinging movement of said crossing parts, jaws and lever arms, said pair of converging planar surfaces of each jaw at other facing locations converging to arcuately concave truncated surfaces defining crimping edges.

2. A tool for electrical connectors and the like, said tool comprising a pair of crossing parts pivotally connected together, a pair of jaws extending from respective crossing parts in facing relation with and swingable toward and away from each other and terminating at free ends, a pair of lever arms extending from respective crossing parts oppositely away from said jaws for swinging movement therewith in facing relation with each other, handgrips extending from the distal ends of said lever arms, a single pair only of convergent entirely planar surfaces on the facing region of each of said jaws and tapering toward each other, the converging planar surfaces of one jaw converging at one location to intersect with each other in a generally straight cutting edge, the converging planar surfaces of the other jaw converging at a facing location to respective intersections with the opposite sides of a generally flat truncated surface defining an anvil for said cutting edge and limiting swinging movement of said crossing parts, jaws and lever arms, said pair of converging planar surfaces of each jaw at other facing locations converging to arcuately concave truncated surfaces defining crimping edges, and a generally semi-conical countersunk formation in the facing region of each of said lever arms, said conical formations each extending to opposite surfaces of its respective arm and terminating at one surface in a semi-circular cutting edge, said countersunk formations being in complementary facing relation for severing engagement with insulation of a wire having its core within said semi-circular cutting edges.

3. A tool for electrical connectors and the like, said tool comprising a pair of crossing parts pivotally connected together, a pair of jaws extending from respective crossing parts in facing relation with and swingable toward and away from each other and terminating at free ends, a pair of lever arms extending from respective crossing parts oppositely away from said jaws for swinging movement therewith in facing relation with each other, handgrips extending from the distal ends of said lever arms, a single pair only of convergent entirely planar surfaces on the facing region of each of said jaws and tapering toward each other, the converging planar surfaces of one jaw converging at one location to a generally straight cutting edge, the converging planar surfaces of the other jaw converging at a facing location to a generally flat truncated surface defining an anvil for said cutting edge and limiting swinging movement of said crossing parts, jaws and lever arms, and a generally semi-conical countersunk formation in the facing region of each of said lever arms, said conical formations each extending to opposite surfaces of its respective arm and terminating at one arm surface in a semi-circular cutting edge, said countersunk formations being in complementary facing relation for severing engagement with insulation of a wire having its core within said semi-circular cutting edges, said lever arms being slightly spaced apart on limiting engagement of said straight cutting edge and anvil to incompletely sever the insulation sufficiently to permit its stripping.

4. A tool for electrical connectors and the like, said tool comprising a pair of elongate jaw members pivotally connected together and extending from their pivotal connection in facing relation with each other to terminate in free ends, said jaw members having facing regions beveled to taper toward each other, one beveled region of one jaw member tapering to a generally straight cutting edge, one beveled region of the other jaw member opposite to said one beveled region of said one jaw member tapering to a generally straight truncated edge facing toward and defining an anvil for said cutting edge, another beveled region of said one jaw member tapering to a first arcuately concave truncated edge, and another beveled region of said other jaw member opposite to said other beveled region of said one jaw member tapering to a second arcuately concave truncated edge and combining therewith to define crimping surfaces, said jaw members each having a single pair of continuous planar convergent surfaces defining the beveled regions.

* * * * *